United States Patent [19]

McConnell

[11] 3,957,329
[45] May 18, 1976

[54] FAULT-CURRENT LIMITER FOR HIGH POWER ELECTRICAL TRANSMISSION SYSTEMS

[75] Inventor: Lorne D. McConnell, Chalfont, Pa.

[73] Assignee: I-T-E Imperial Corporation, Spring House, Pa.

[22] Filed: Nov. 1, 1974

[21] Appl. No.: 519,993

[52] U.S. Cl................................ 316/16; 317/40 A
[51] Int. Cl.² ........................................ H02H 3/08
[58] Field of Search.................. 317/16, 40 A, 12 R, 317/12 A, 61, 61.5, 11 R, 11 A, 11 C; 323/76, 77; 307/51, 135, 136; 337/114, 143, 145, 148, 155, 150

[56] References Cited
UNITED STATES PATENTS

| | | | |
|---|---|---|---|
| 2,468,498 | 4/1949 | Kyle, Jr. et al. ................... | 317/16 X |
| 2,504,860 | 4/1950 | Marbury ........................... | 317/16 X |
| 2,567,413 | 9/1951 | Ryan et al. ........................ | 317/16 X |
| 2,656,490 | 10/1953 | Ryan................................. | 317/12 A |
| 2,810,865 | 10/1957 | Minder ........................ | 317/40 A X |
| 3,461,308 | 8/1969 | Kalkner et al. ................ | 317/61.5 X |
| 3,522,472 | 8/1970 | Breitholtz ........................ | 317/16 X |
| 3,590,319 | 6/1971 | Baltensperger..................... | 317/16 X |
| 3,599,137 | 8/1971 | Toshioito et al.................... | 337/114 |

FOREIGN PATENTS OR APPLICATIONS 860,307  9/1939  France.............................. 317/12 A Primary Examiner—R. N. Envall, Jr.
Assistant Examiner—Patrick R. Salce
Attorney, Agent, or Firm—Ostrolenk, Faber, Gerb & Soffen

[57] ABSTRACT

A fault-current limiter is formed as a self-contained unit which can be connected in an existing power transmission system. The fault-current limiter consists of a series-connected inductor and capacitor which are resonant with the power line frequency, and a normally open switch is in parallel with the capacitor. A sodium fuse connected in series with a calibrating impedance is connected in parallel with the switch and the fuse is operated under predetermined circuit current conditions. The sodium fuse extends an operating plunger upon its operation, and the plunger causes the switch to close, thereby to short-circuit the capacitor and connect the current-limiting impedance of the inductor in the main power circuit.

13 Claims, 4 Drawing Figures

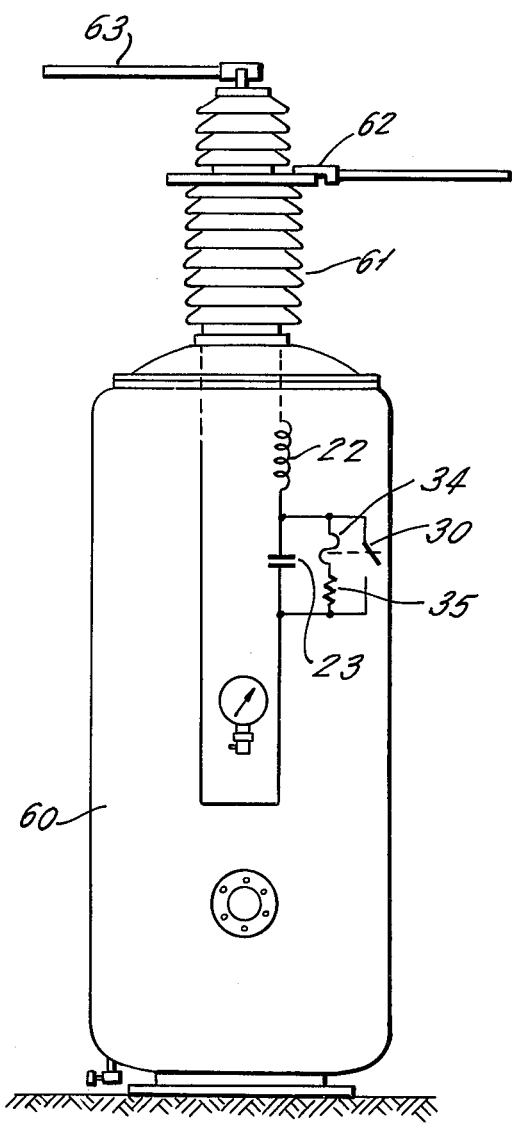

FAULT-CURRENT LIMITER FOR HIGH POWER ELECTRICAL TRANSMISSION SYSTEMS

BACKGROUND OF THE INVENTION

This invention relates to fault-current limiters, and more specifically relates to a novel fault-current limiter for high power electric systems in which a fault-responsive device, such as sodium fuse, controls the insertion of current-limiting impedance into this circuit under given current conditions.

The utility industry is experiencing a rapid growth in system short-circuit currents as a result of ever increasing generator sizes and system interconnections. These changes have been instituted in a quest for economies and greater reliability but often unknowingly have been offset by changes in other parts of the system. Thus, circuit breakers have become more expensive; system components have had to be increased in mechanical strength to overcome the magnetic forces created by the higher short-circuit currents. Reliability has been reduced due to the transformer through-current destructive forces. System stabililty has been affected as a result of the larger fault currents. Expenses have been incurred as older circuit breakers have had to be replaced due to the increased interrupting requirements.

A fault-current limiter which can limit fault current to between 30 and 40 percent of its potential peak value will reduce the requirements for high-current interrupting circuit breakers, reduce transformer thru-currents, and allow transformer designs which are more reliable and economical. It will also allow more economical overhead line designs as line burndown problems will be reduced and will increase system stability. In general, a fault-current limiter will reduce costs and increase system reliability wherever magnetic forces and fault current thermal problems are limitations in design. Systems operating practices (i.e., system stability) and economics of construction will be enhanced.

The present fuel shortage is going to require even larger generating units in the future through the use of overlapping transmission grids to increase reliability which will add to the already rapid growth of fault currents being experienced by the electric power utilities.

In one major utility 230 kV system, fault levels have grown from a maximum of 6 GVA in 1955 to 15 GVA in 1965 and to considerably greater than 20 GVA by 1970. At the present time, the system is operated with interconnections opened to limit fault-current levels within the capability of connected buses, disconnects, and circuit breakers. The elimination of such interconnections however jeopardizes security and stability of the system and imposes inefficiencies in operation of the system. These penalties are paid to obtain adequate life on recently installed substation equipment to avoid the heavy costs of replacement of this equipment and to keep fault levels down to levels for which equipment designs are available.

On this same system, major increases in connected generation will be made within the next few years. Fault levels in some parts of the system will increase to an excess of 30 GVA by about 1975. Projecting this curve of fault level growth, one can project need for 40 GVA by the early 1980's. Thus, equipment purchased today with 30 GVA fault capability may have a life expectancy of less than 10 years.

Power transformer failures are rapidly increasing due to exposure to higher and higher through-fault currents. High costs and penalties are being paid by allowing fault-current levels to increase unchecked as system growth takes place.

To date, however, there is only one circuit and system that has found limited application to fault-current limitation in electric power systems. This is the series L-C resonant form of limiter, in which the capacitance element is switched out under fault current conditions, leaving the inductive impedance of the inductor in the series circuit.

To date the L-C resonant limiter has been developed and applied employing component or element packaging, and saturable reactor switching of the capacitance element. Because of these factors, this form of limiter is uneconomical and is physically so large (as large as the main power transformer of the system) that substation space cannot often be found to accommodate it.

BRIEF DESCRIPTION OF THE INVENTION

In accordance with the present invention, a novel fault-current limiter is formed of relatively small, commercially available components which may be contained within a self-contained dead tank housing for connection in a new or pre-existing power transmission system. Thus, the invention employs a current-limiting impedance of any desired type which is connected in series with the power line to be protected. This impedance may take the form of a linear or non-linear resistor, or an air core reactor, or one component (the capacitor) of a resonant L-C circuit. The impedance or a component thereof then cooperates with a switching device, such as a vacuum switch which connects the impedance relative to the circuit being protected so as to normally remove the impedance from the circuit, and to insert the impedance in the circuit in response to the appearance of a fault in the circuit.

Where the impedance is a single resistor or inductor, the impedance is normally short-circuited by a normally closed switch device such as a vacuum switch. The vacuum switch is then operated to an open position in accordance with the appearance of a fault on the line being protected so that the current-limiting impedance is then inserted into the main power line.

Where the impedance is a resonant L-C circuit, the switching device is normally open vacuum switch in parallel with the capacitor of the L-C circuit. The vacuum switch is closed in response to a fault in the system, thereby to short-circuit the capacitor and to insert the inductance of the reactor in the circuit to serve a current-limiting effect.

Any type of fault-responsive device or current-responsive device can be selected to operate the vacuum switch from an open-to-closed or closed-to-open position responsive to the appearance of a fault on the line. One such device is a sodium fuse, although any device with equivalent characteristics can be used. These preferred characteristics are:

Operation in response to a definite and predictable through-put of current and time, or of current-squared and time;

The device should change from a relatively low impedance to a relatively high impedance when it operates;

The device should provide a mechanical output for operation of the capacitor bypass switch;

Upon removal of through current (as when the by-pass switch operates) the device should be self-resetting by thermal cooling, contraction, or change of state.

Sodium fuses provide the above characteristics and can be used in the combination of the invention. Similarly, alkali metals, mercury, saline water and other conductive solutions can be used in the fuse as the conductive medium.

When the device takes the form of a sodium fuse, the fuse is connected to carry either all or part of the line current and ejects an output plunger upon its operation, which in turn will operate the vacuum switch to its opposite position. Sodium fuses automatically reset after operation and the vacuum switch may be automatically reclosed or reopened after its operation and after the system circuit breakers have opened the faulted circuit breakers. Thus, the current limiter may be made ready for its next operation without the need for further attention by maintenance personnel.

BRIEF DESCRIPTION OF THE DRAWINGS

FIG. 4 is an elevational plan view of a dead tank housing for receiving the novel current-limiter assembly of the present invention, showing the embodiment of an L-C resonant type circuit.

DETAILED DESCRIPTION OF THE DRAWINGS

Figure 1:
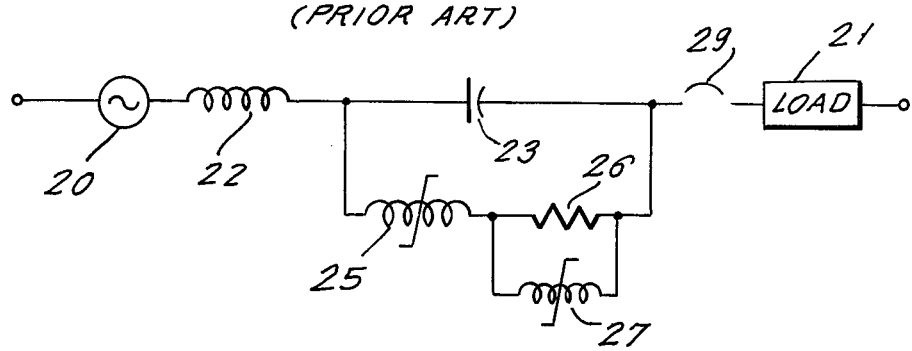
FIG. 1 is a circuit diagram of a prior art fault current-limiting device which is connected in a schematically-illustrated high power electrical transmission system.

Referring first to FIG. 1, there is illustrated therein a prior art type of current-limiter circuit for a high power electrical transmission line wherein one phase of the transmission line is schematically illustrated and is shown as including a source 20 and a load 21. The high power transmission line can have any desired rating and, by way of example, could be from 15 kV to 230 kV or above. At 230 kV the line current through the load 21 might be 2000 amperes, and the fault current the order of 60–70 kA.

In order to limit the rise of fault current in the event of a fault on the line, it is known to use an air core inductor 22 connected in series with a capacitor 23 in the line being protected. The inductor 22 and capacitor 23 are tuned for series resonance at the line frequency so that, for example, at 60 cycles, the inductive impedance of inductor 22 equals the capacitive impedance of capacitor 23. Thus, the combinattion does not normally affect conduction of power in the transmission line. A saturable reactor 25 is connected in parallel with capacitor 23 and in series with a calibrating resistor 26. A second saturable reactor 27 is connected in parallel with resistor 26. The reactors 25 and 27 are so designed that they are normally unsaturated by voltages across the capacitor 23 which correspond to normal line current conditions. However, if a fault current appears on the line, the increase in voltage on capacitor 23 rises to apply a sufficient number of volt-seconds to the saturable reactors 25 and 27 to saturate the reactors, thereby in effect short-circuiting the capacitor 23. With the capacitor 23 short-circuited, the inductance of air core reactor 23 now appears directly in the circuit and will exercise a current-limiting action on the rise of fault current in the circuit. A conventional transmission line circuit breaker 29 is provided to ultimately interrupt the circuit if the fault remains for longer than a given time.

The major disadvantage of the circuit of FIG. 1 is that the saturable reactors 25 and 27 become extremely large and indeed reach the size of the main power transformer in the system. Moreover, these components have been made in the past as separately mounted components. Thus, the inductor 22, capacitor 23, reactors 25 and 27 and resistor 26 have been separately housed and mounted and are connected together by external wiring.

Figure 2:
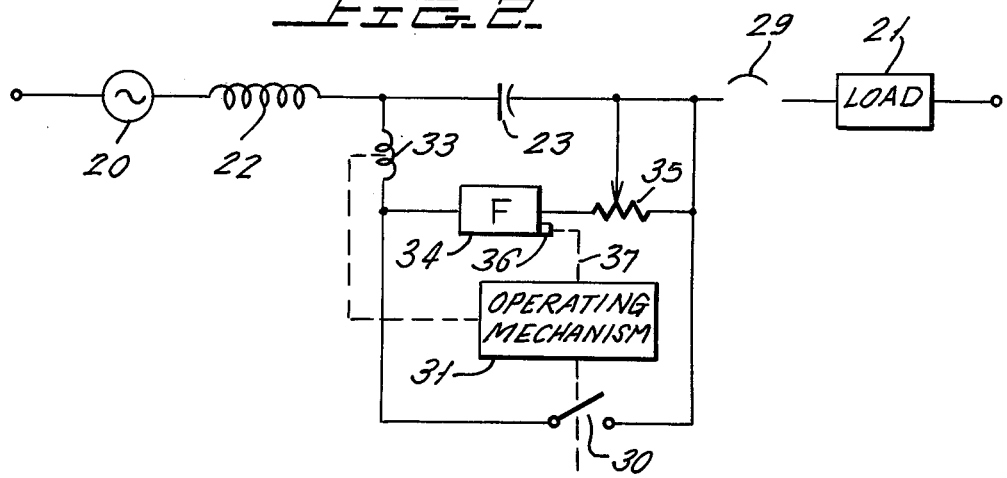
FIG. 2 is a schematic diagram illustrating the novel circuit of the present invention wherein a suitable fuse initiates the short-circuiting of the capacitor of a resonant inductance-capacitance circuit upon the sensing of a fault current.

In accordance with the present invention, a novel arrangement is provided wherein the functions described in connection with FIG. 1 of inserting a current-limiting impedance is response to a fault current are carried out in a novel and inexpensive way using relatively small and commercially available components. Referring to FIG. 2, similar numerals identify components similar to those of FIG. 1.

The short-circuiting of the capacitor 23 in FIG. 2 is accomplished by a high speed contact switch 30 wherein switch 30 in practice could be a conventional vacuum interrupter switch. The switch 30 is normally open so that the capacitor 23 is normally connected in the transmission line along with inductor 22 which is resonant with capacitor 23 at the transmission line frequency.

A suitable operating mechanism 31 is then provided for operating the vacuum switch 30 and the operating mechanism 31 is in turn controlled by both a pick-up coil 33 and a sodium fuse 34 as will be described hereinafter. The sodium fuse 34 may be conventional commercially available type fuse which has a low impedance under rated current conditions and a very high impedance when the current through the fuse exceeds some particular current for some particular length of time, thus causing the vaporization of conducting sodium path within the fuse. The fuse 34 is connected in series with an adjustable calibrating resistor 35.

Fuse 34 is further provided with a plunger 36 which is connected to the operating mechanism 31 in any desired manner as schematically illustrated by dotted line 37. Plunger 36 is ejected outwardly upon the operation of the fuse, and may automatically reset when the fault current is cleared. The operating mechanism 31 for vacuum switch 30 may be of any desired type and will include a conventional latch and source of spring-biasing pressure to close the vacuum switch contacts under high pressure. The operation of fuse 34 will cause the plunger 36 to be ejected, thereby unlatching the operating mechanism 31 to permit or cause the high speed closing of switch 30. The coil 33 monitors the current conditions in the transmission line and operates to permit the reopening of switch 30 after the switch 30 has been closed when the fault-current conditions disappear from the line.

In the design of a typical circuit employing the present invention, the line protected can be a 69 kV line having a normal current rating of 1200 amperes. The inductor 22 is an air core reactance having an inductive impedance of the order of 1 ohm and the capacitor 23 has a capacitive impedance of 1 ohm. The calibrating resistor 35 has a resistance of greater than 10 times the capacitive reactance of capacitor 23 and may have a value of about 10–20 ohms. Fuse 34 is designed to open or operate in such a manner as to reduce the fault current flowing in the transmission line system by about 50 percent of its full available value, or from the order of 40 kA down to 20 kA.

It is to be noted that the arrangement described above and the permanent power fuse 34 which is self-recovering is of the type shown in conference paper C74177-2 of the I.E.E.E. Switchgear Committee of the I.E.E.E. Power Engineering Society which was presented at the I.E.E.E. Winter Show Meeting Jan. 21 to Jan. 27, 1974.

The operation of the circuit of FIG. 2 is as follows:

Under normal current-carrying conditions on the transmission line, the fuse 34 carries a small current through the calibrating resistor 35 and the operating mechanism 31 maintains switch 30 in its normally open position. Thus, the series resonant inductor 22 and capacitor 23 are connected in the transmission line circuit. If now a fault current appears on the transmission line, the voltage across capacitor 23 increases to a value to produce sufficient current through the fuse 34 for a time of the order of 1 millisecond to cause its operation. The operation of fuse 34 then causes the ejection of plunger 36 and thus the operation of operating mechanism 31 which causes the closing of the vacuum switch 30. The closing of the vacuum switch 30 then causes the short-circuiting of capacitor 23 which causes the full inductance of inductor 22 to be inserted in the transmission line, thereby limiting the rate of rise of current in the circuit, and reducing the magnitude of short-circuit current which flows. The circuit may be ultimately opened by conventional transmission line breaker 29 if the fault is not cleared within a given time. Once the fault current is cleared or the circuit is opened by breaker 29, the fuse 34 is automatically reset by the condensation of the sodium within the fuse and the operating mechanism 31 reopens switch 30. If the transmission line is still carrying power, the opening of switch 30 will cause the commutation of current from the switch 30 back into the capacitor and the system is now reinstated to its original condition and is ready for a further current fault-limiting operation if necessary.

Figure 3:
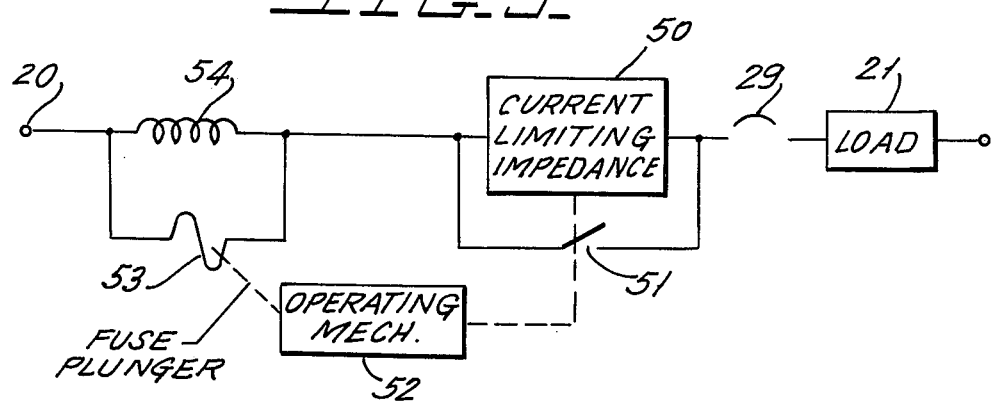
FIG. 3 shows a second embodiment of the invention where a fuse operator initiates the insertion of a current-limiting impedance into a high power line responsive to the sensing of a fault-current condition.

FIG. 3 shows a further embodiment of the invention and illustrates the manner in which the invention can be used in connection with other forms of current-limiting devices. In FIG. 3, the current-limiting impedance which was shown in FIGS. 1 and 2 as the resonant circuit 22–23 is replaced by a generalized current-limiting impedance 50 which could take the form of a linear or non-linear resistor or which could take the form of an air core reactor. The current-limiting impedance 50 is then provided with a parallel-connected switch 51 which is similar to vacuum switch 30 in FIG. 2 and has interruption capacity. In the case of FIG. 3, however, the switch 51 is normally closed and normally short-circuits the current-limiting impedance 50. Moreover, switch 51 should be capable of producing a high arc voltage in order to cut in impedance 50.

The operating mechanism 52 for switch 51 is essentially similar to operating mechanism 31 in FIG. 2 and is operated under the influence of an ejected plunger or the like from the fuse 53 which is essentially identical to the fuse 34 of FIG. 2. The fuse 53 is then connected in parallel with a signal inductance coil 54 which is connected in series with the transmission line.

In the circuit of FIG. 3, the ratio of inductive impedance to resistance for the sodium fuse 53 is extremely low while the ratio of resistance to inductive impedance for the signal inductor 54 is very low. Thus, under normal current conditions, most current flow is through the signal inductor 54 which now produces a calibrated voltage drop across the fuse 53. Once the current in the transmission line exceeds some given value, the voltage drop across inductor 54 is sufficient to operate the fuse 53, thereby releasing its plunger to operate the operating mechanism 52, thereby opening the switch 51. This then inserts the current-limiting impedance 50 into the transmission line circuit in series with load 21, thereby tending to limit the maximum fault current in the transmission line circuit. Once the fault current disappears or the circuit is opened by the circuit breaker 29, the fuse 53 recovers, allowing the operating mechanism 52 to be reset and close the switch 51, thereby shorting out the impedance 50.

FIG. 4 illustrates a grounded tank 60 which may be used to receive all of the components of the fault-current limiter so that the single tank is now a unit component which can be mounted in an existing or new transmission line to add current-limiting capability to the line. The tank 60 can, if desired, be filled with an insulating gas such as $SF_6$ at one or more atmospheres. Tank 60 has a coaxial terminal bushing 61 extending from its top which contains spaced terminals 62 and 63 which may be connected directly into a transmission line. The overall height of the tank for service in a 69 kV line may be about 14 feet from ground to the top of bushing 61 and the terminals 62 and 63 may be vertically spaced from one another by about 12 inches. The fault limiter components are then assembled within the interior of tank 60 as schematically illustrated for the components including inductor 22, capacitor 23, fuse 34, resistor 35 and vacuum switch 30 of the circuit of FIG. 2. It is also possible to mount the components of FIG. 3 including components 50 through 54 within the interior of tank 60 if the circuit of FIG. 3 is used instead of the circuit of FIG. 2.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privelege or property is claimed are defined as follows:

1. A fault-current limiting device for a high power electrical transmission line, comprising in combination:
   a dead tank housing for said fault-current limiting device; said housing having bushing terminal means containing spaced and insulated first and second terminals adapted for series connection in a power transmission line;
   a series-connected inductor and capacitor mounted within said housing and connected in series with said first and second terminals; said inductor and said capacitor being tuned to one another for series resonance at the frequency of said power transmission line;
   a high-speed contact switching device and an operating mechanism therefor for opening and closing said high speed contact switching device; said high-speed contact switching device being mounted within said housing and being connected in parallel with said capacitor; said switching device being normally open;

pick-up means connected in series with said switching device for monitoring the current flowing therethrough;

a high-speed current-responsive device mounted within said housing and connected in parallel with said capacitor and in series with a calibrating resistor, whereby, when the current through said fault-current device exceeds a definite and predictable value of current and time or current-squared and time, said current-responsive device is operated to limit current flow therethrough; said current-responsive device having a mechanical output member connected thereto and actuated in response to the operation of said current-responsive device;

said mechanical output member and said pick-up means being connected to said operating mechanism of said high-speed contact switching device, whereby, when the current in said transmission line exceeds said given value, said current-responsive device is operated to cause said normally open high-speed contact switching device to close, thereby to short-circuit said capacitor and to allow said inductor to exert a current-limiting action on the continued rise of current said transmission line; said pick-up means actuating said operating mechanism to permit said high-speed contact switching device to open only when the current flowing through said switching device falls below another predetermined value, thereby removing the short-circuit from said capacitor after the fault-current is limited to a value less than said another predetermined value.

2. The device of claim 1 wherein said transmission line has a frequency of from 50 to 60 hertz and wherein said inductor has an air core.

3. The device of claim 2 wherein said high-speed contact switching device is a vacuum interrupter.

4. The device of claim 2 wherein said high-speed current-responsive device is a sodium fuse and is self-resettable after an interruption operation.

5. A fault-current limiting device comprising, in combination:

a series-connected inductor and capacitor tuned to one another for series resonance at about 60 hertz;

a normally open high-speed contact switching device and an operating mechanism therefor for opening and closing said high-speed switching device; said switching device being connected in parallel with said capacitor;

a high-speed current-responsive device connected in parallel with said capacitor and in series with a calibrating resistor, whereby, when the voltage across said capacitor exceeds a given value, said current-responsive device is operated to limit current flow therethrough; said current-responsive device having a mechanical output member connected thereto and actuated in response to the operation of said current-responsive device;

a pick-up device connected in series with said switching device for monitoring the current flowing therethrough;

said mechanical output member and said pick-up device being connected to said operating mechanism of said high-speed contact switching device, whereby, when the voltage across said capacitor and thus the current flow therethrough exceeds a definite and predictable value of current and time or current-squared and time, said current-responsive device is operated to cause said normally open high-speed contact switching device to close, thereby to short-circuit said capacitor; said pick-up device actuating said operating mechanism to cause said switch device to open only when the value of said current flowing through said pick-up device falls below another predetermined value to remove the short-circuit from the capacitor only after the fault-current has been limited to a value less than said another predetermined value.

6. The device of claim 5 wherein said high-speed contact switching device is a vacuum interrupter.

7. The device of claim 6 wherein said high-speed current-responsive device is a sodium fuse and is self-resettable after an interruption operation.

8. A fault-current limiting device for a power transmission circuit comprising, in combination:

a current-limiting impedance means in series with said power transmission circuit;

a switch device connected in parallel with at least a portion of said current-limiting means;

a current-responsive fuse device coupled to said power transmission circuit and carrying at least a portion of the current of said circuit; said fuse device having plunger means which is extended in response to the operation of said fuse device;

an operating mechanism for said switch device for operating said switch device between an open position and a closed position;

and means connecting said plunger means to said operating mechanism, whereby said switch device is switched from one contact condition to another in response to the operation of said fuse device.

9. The fault-current limiting device of claim 8 wherein said impedance means includes a series-connected inductor and capacitor tuned to the frequency of said circuit; said switch device being normally open and being connected in parallel with said capacitor and said fuse device.

10. The fault-current limiting device of claim 8 wherein said impedance means is an air core inductor and wherein said switch device is normally closed.

11. The fault-current limiting device of claim 8 wherein said impedance means is a resistor, and wherein said switch device is normally closed.

12. The fault-current limiting device of claim 8 which further includes a grounded support tank for receiving all components of said fault-current limiting device therein; and first and second terminals for said fault-current limiting device extending through said tank for connection in an external circuit.

13. A fault-current limiting device for a high power electrical transmission line having a frequency of from 50 to 60 hertz, comprising in combination:

a dead tank housing for said fault-current limiting device; said housing consisting of a conductive body connected to ground potential and having bushing terminal means containing spaced and insulated first and second terminals adapted for series connection in a power transmission line;

a series connected air-core inductor and capacitor mounted within said housing and connected in series with said first and second terminals; said inductor and said capacitor being tuned to one another for series resonance at the frequency of said power transmission line;

a high-speed contact switching device and an operating mechanism therefor for opening and closing said high-speed contact switching device; said high-speed contact switch device being mounted within said housing and being connected in parallel with said capacitor; said switching device being normally open;

a high-speed current-responsive device mounted within said housing and connected in parallel with said capacitor and in series with a calibrating resistor, whereby, when the current through said fault-current device exceeds a definite and predictable value of current and time or current-squared and time, said current-responsive device is operated to limit current flow therethrough; said current-responsive device having a mechanical output member connected thereto and actuated in response to the operation of said current-responsive device;

said mechanical output member being connected to said operating mechanism of said high-speed contact switching device, whereby when the current in said transmission line exceeds said given value, said current-responsive device is operated to cause said normally open high-speed contact switching device to close, thereby to short-circuit said capacitor and to allow said inductor to exert a current-limiting action on the continued rise of current in said transmission line.

* * * * *